United States Patent
Nakamura et al.

(10) Patent No.: US 7,512,471 B2
(45) Date of Patent: Mar. 31, 2009

(54) CONTROL DEVICE FOR WORKING VEHICLE

(75) Inventors: Kazunori Nakamura, Tsuchiura (JP); Tsuyoshi Nakamura, Ibaraki-ken (JP); Kentaro Itoga, Abiko (JP); Genroku Sugiyama, Ryuugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 535 days.

(21) Appl. No.: 10/545,322

(22) PCT Filed: Aug. 10, 2004

(86) PCT No.: PCT/JP2004/011467

§ 371 (c)(1),
(2), (4) Date: Aug. 12, 2005

(87) PCT Pub. No.: WO2005/014989

PCT Pub. Date: Feb. 17, 2005

(65) Prior Publication Data

US 2006/0167607 A1 Jul. 27, 2006

(30) Foreign Application Priority Data

Aug. 12, 2003 (JP) ............................. 2003-292485

(51) Int. Cl.
*F02D 29/00* (2006.01)
*G06G 7/70* (2006.01)
(52) U.S. Cl. ..................... 701/50; 701/54; 701/103; 60/443
(58) Field of Classification Search .............. 701/53, 701/55, 56, 84, 103; 60/443, 449, 428, 431; 123/361, 481, 493, 339
See application file for complete search history.

(56) References Cited

U.S. PATENT DOCUMENTS

| 4,773,369 | A |   | 9/1988  | Kobayashi et al. |
|-----------|---|---|---------|------------------|
| 4,904,161 | A | * | 2/1990  | Kamide et al. ................ 417/22 |
| 5,077,973 | A |   | 1/1992  | Suzuki et al. |
| 5,249,421 | A | * | 10/1993 | Lunzman ..................... 60/422 |
| 5,469,646 | A | * | 11/1995 | Takamura ..................... 60/428 |
| 5,481,875 | A | * | 1/1996  | Takamura et al. ............. 60/443 |
| 6,010,309 | A | * | 1/2000  | Takamura et al. ............. 417/22 |

FOREIGN PATENT DOCUMENTS

| JP | 61-200343 | 9/1986 |
| JP | 2-38630   | 2/1990 |
| JP | 8-6613    | 1/1996 |
| JP | 2968558   | 8/1999 |

* cited by examiner

*Primary Examiner*—Tan Q Nguyen
(74) *Attorney, Agent, or Firm*—Mattingly, Stanger, Malur & Brundidge, P.C.

(57) ABSTRACT

The invention provides a control system for a working vehicle, which can realize higher work performance and better fuel economy in a compatible way. A controller 10 includes table 10a, 10b and tables 10e, 10f for deciding maximum pump absorption torques and engine output torques based on an engine revolution speed, and selectors 10c, 10g for switching over the decided maximum pump absorption torques and engine output torques depending on a work performance mode or a fuel economy mode is selected. A pump absorption torque characteristic for the fuel economy mode is set so as to provide a relative small maximum pump absorption torques TB in a high revolution range, and an engine output characteristic for the fuel economy mode is set so as to provide a relatively small engine output torque in the high revolution range.

3 Claims, 11 Drawing Sheets

CONTROL DEVICE FOR WORKING VEHICLE

TECHNICAL FIELD

The present invention relates to a control system for a working vehicle, such as a wheel loader or a telescopic handler, in which a transmission is driven by an engine for traveling of the vehicle and a hydraulic pump is also driven by the engine to operate a working actuator, thereby performing predetermined work.

BACKGROUND ART

The related art regarding a control system for the above-mentioned type of working vehicle is disclosed in JP,B 8-6613 and Japanese Patent No. 2968558.

The related art disclosed in JP,B 8-6613 is intended for a system in which two kinds of engine output characteristics, i.e., an engine output characteristic adapted for work and an engine output characteristic adapted for traveling, are prepared and the engine output characteristics are switched over from one to the other for control of an engine output in use depending on whether a vehicle is in a working state or a traveling state. When the vehicle is in the traveling state and a torque converter speed ratio is small (low speed), the amount of injected fuel is controlled so that a transmission torque will not exceed the torque in the working state, thereby preventing generation of an excessive torque applied to a torque converter.

According to the related art disclosed in Japanese Patent No. 2968558, when the sum of respective loads of a travel driving unit and an actuator is smaller than an engine output torque, a pump absorption torque is increased to ensure work performance. Also, when the load sum is larger than the engine output torque, the pump absorption torque is reduced to ensure a large travel torque for maintaining a large tractive force.

Patent Reference 1: JP,B 8-6613
Patent Reference 2: Japanese Patent No. 2968558

DISCLOSURE OF THE INVENTION

Problems to be Solved by the Invention

In a working vehicle, such as a wheel loader or a telescopic handler, work requiring a front operating mechanism to be operated while traveling (i.e., combined work of travel and front work using the front operating mechanism) is performed in many cases. In such combined work, the amount of work performed by the front operating mechanism varies considerably depending on the type of work. When the amount of work carried out by the front operating mechanism is large in the combined work of travel and front work using the front operating mechanism, the absorption torque of a hydraulic pump also becomes large and the sum of the absorption torque of the hydraulic pump and the transmission torque (travel torque) exceeds the engine output torque, thus resulting in an operating state where the engine output is utilized at full capacity. In that type of work, therefore, the engine output torque is desirably set to a level as high as possible in order to increase the work performance. On the other hand, when the amount of work carried out is small, the absorption torque of the hydraulic pump also becomes small and the sum of the absorption torque of the hydraulic pump and the transmission torque (travel torque) is smaller than the engine output torque. In that case, therefore, it is desired to reduce the engine output torque, if possible, from the viewpoint of improving fuel economy.

With the related art disclosed in JP,B 8-6613, the engine output characteristic adapted for work and the engine output characteristic adapted for traveling can be switched over from one to the other. When the engine output characteristic adapted for work is selected, the engine output torque is increased and therefore higher work performance is expected, and when the engine output characteristic adapted for traveling is selected, the engine output torque is reduced and therefore the fuel economy effect is expected. However, the disclosed related art is disadvantageous in that, in the work requiring the operation of the front operating device, the engine output characteristic adapted for work is selected even when the amount of work carried out is small, and hence the fuel economy effect cannot be obtained.

With the related art disclosed in Japanese Patent No. 2968558, the absorption torque of the hydraulic pump is changed depending on the working state, while the engine output characteristic is held constant. Accordingly, the fuel economy effect cannot be obtained in small-load work.

Thus, any related art has a difficulty in realizing higher work performance and better fuel economy in a compatible way.

An object of the present invention is to provide a control system for a working vehicle, which can realize higher work performance and better fuel economy in a compatible way.

Means for Solving the Problem (1) To achieve the above object, the present invention provides a control system for a working vehicle comprising an engine, a fuel injector for controlling an output torque and revolution speed of the engine, a transmission for traveling which is driven by the engine, a variable displacement hydraulic pump driven by the engine, and a hydraulic actuator driven by a hydraulic fluid delivered from the hydraulic pump, and first pump torque control means for controlling an absorption torque of the hydraulic pump not to exceed a maximum absorption torque, wherein the control system comprises switching-over means; engine torque control means for selecting one of at least two preset engine output torque characteristics in response to an instruction from the switching-over means and controlling the fuel injector in accordance with the selected engine output characteristic, thereby controlling the output torque of the engine; and second pump torque control means for selecting one of at least two preset pump absorption torque characteristics in response to the instruction from the switching-over means and controlling the maximum absorption torque of the hydraulic pump in accordance with the selected pump absorption torque characteristic.

Thus, the switching-over means, the engine torque control means, and the second pump torque control means are provided, and the engine output torque characteristics and the pump absorption torque characteristics are switched over in response to the instruction from the switching-over means to control the fuel injector and the pump torque control means, thereby controlling the engine output torque and the pump absorption torque. Accordingly, when the amount of work carried out is large, the work performance can be increased by selecting the engine output characteristic that provides a relatively large engine output torque, and when the amount of work carried out is small, the fuel economy effect can be obtained by selecting the engine output characteristic that provides a relatively small engine output torque. As a result, higher work performance and better fuel economy can be realized in a compatible way.

(2) In above (1), preferably, the switching-over means is a switch for instructing one of a work performance mode and a fuel economy mode; the engine torque control means selects the output torque characteristic providing, in the fuel economy mode, a slightly smaller engine output torque in a relatively high range of the engine revolution speed than that in the work performance mode; and the second pump torque control means selects the pump absorption torque characteristic providing, in the fuel economy mode, a slightly smaller maximum pump absorption torque in the relatively high range of the engine revolution speed than that in the work performance mode corresponding to a reduction of the engine output torque made by the engine torque control means.

In a working vehicle, such as a wheel loader or a telescopic handler, a travel force (tractive force) is important. It is therefore desired that the travel force be as large as possible regardless of any working state.

In the fuel economy mode, the maximum pump absorption torque characteristic is selected which provides a slightly smaller pump absorption torque in the relatively high range of the engine revolution speed than that in the work performance mode corresponding to a reduction of the engine output torque made by the engine torque control means. Even with the engine output torque slightly reduced, therefore, it is possible to avoid a reduction of the travel torque and to obtain good workability.

(3) In above (1) or (2), preferably, the engine torque control means computes a fuel injection amount corresponding to the engine revolution speed at the current time in accordance with the selected engine output characteristic and controls the fuel injector by limiting a target fuel injection amount to be not larger than the computed fuel injection amount.

That feature enables the selected engine output characteristic to be obtained as intended.

(4) In above (1) or (2), preferably, the engine torque control means sets, as the engine output characteristic, a fuel injection amount characteristic with respect to the engine revolution speed and controls the fuel injector by limiting a target fuel injection amount to be not larger than a fuel injection amount decided in accordance with the fuel injection amount characteristic.

That feature enables the selected engine output characteristic to be obtained as intended.

Advantages of the Invention

According to the present invention, it is possible to realize higher work performance and better fuel economy in a compatible way.

Also, even when the engine output torque is relatively small in the fuel economy mode, a reduction of the travel torque can be avoided and good workability can be obtained.

REFERENCE NUMERALS

1 engine
2 electronic fuel injector
4 torque converter
5 transmission
6 axle
8 travel pedal
10 controller
10a, 10b tables regarding maximum pump absorption torque
10c selector
10d output unit
10e, 10f tables regarding engine output torque
10g selector
10h fuel injector control unit
11 mode select switch
15 hydraulic pump
16 control valve
17 actuator
21 torque control regulator
22 torque control solenoid valve
25 revolution sensor
100a revolution speed deviation computing unit
100b fuel injection amount converting unit
100c integral addition unit
100d maximum fuel injection amount computing unit
100e limit computing unit
100f primary delay element

BEST MODE FOR CARRYING OUT THE INVENTION

Embodiments of the present invention will be described below with reference to the drawings.

Figure 1:
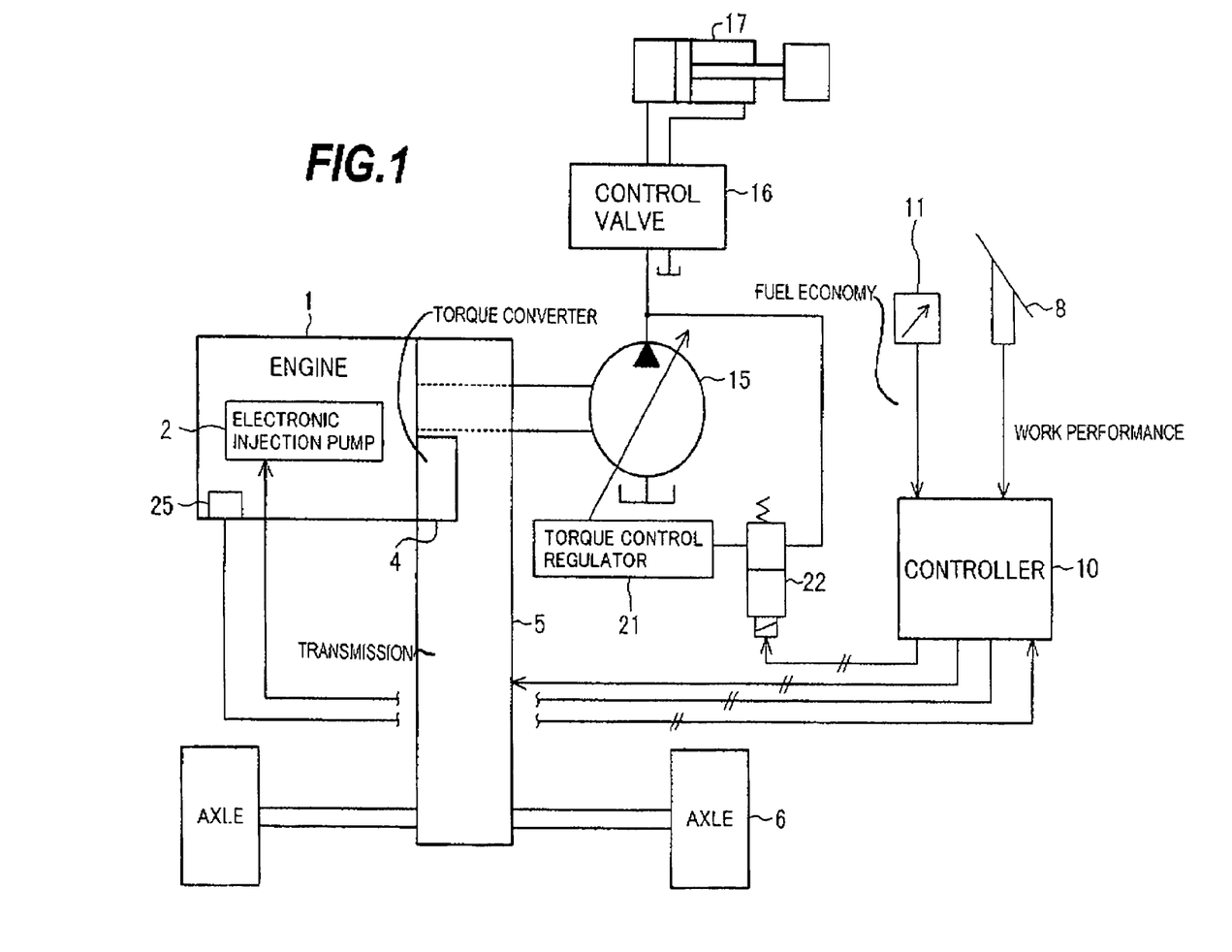
FIG. 1 is a block diagram of an overall driving system including a control system for a working vehicle according to a first embodiment of the present invention.

FIG. 1 is a block diagram of an overall driving system including a control system for a working vehicle according to a first embodiment of the present invention.

In FIG. 1, a working vehicle according to this embodiment includes a diesel engine (hereinafter referred to simply as an "engine" 1) serving as a prime mover. The engine 1 is provided with an electronic fuel injector 2, and the electronic fuel injector 2 controls the output torque and revolution speed of the engine 1. A transmission 5 for traveling, including a torque converter 4, is coupled to an output shaft of the engine 1. The engine 1 drives the transmission 5, whereupon axles 6 are rotated so that the vehicle travels. A travel pedal 8 is provided as means for instructing a target revolution speed of the engine 1. A signal from the travel pedal 8 is inputted to a controller 10. In accordance with the input signal, the controller 10 outputs a control signal to the electronic fuel injector 2 and controls the fuel injection amount. Further, a mode select switch 11 is provided as means for instructing switching-over between a work performance mode and a fuel economy mode, and a signal from the mode select switch 11 is also inputted to the controller 10.

A variable displacement hydraulic pump 15 is coupled to the output shaft of the engine 1, and the hydraulic pump 15 is driven by the engine 1 to deliver a hydraulic fluid. A control valve 16 is connected to a fluid delivery line of the hydraulic pump 15. The control valve 16 is operated by operating means, such as a control lever, for supply of the hydraulic fluid to an actuator 17. The actuator 17 is, e.g., a hydraulic cylinder for driving a front operating mechanism of the wheel loader.

The hydraulic pump 15 is provided with a torque control regulator 21. When the delivery pressure of the hydraulic pump 15 rises, the torque control regulator 21 reduces the tilting (displacement) of the hydraulic pump 15 in a responsive manner to control the tilting (displacement) of the hydraulic pump 15 so that the absorption torque of the hydraulic pump 15 will not exceed a setting value (maximum pump absorption torque). The setting value (maximum pump absorption torque) of the torque control regulator 21 is variable and controlled by a torque control solenoid valve 22. The torque control solenoid valve 22 is a solenoid proportional valve operated with the delivery pressure of the hydraulic pump 15 serving as a hydraulic pressure source, and is operated by a control signal outputted from the controller 10.

Further, the engine 1 is provided with a revolution sensor 25 for detecting the engine revolution speed, and a signal from the revolution sensor 25 is also inputted to the controller 10.

Figure 2:
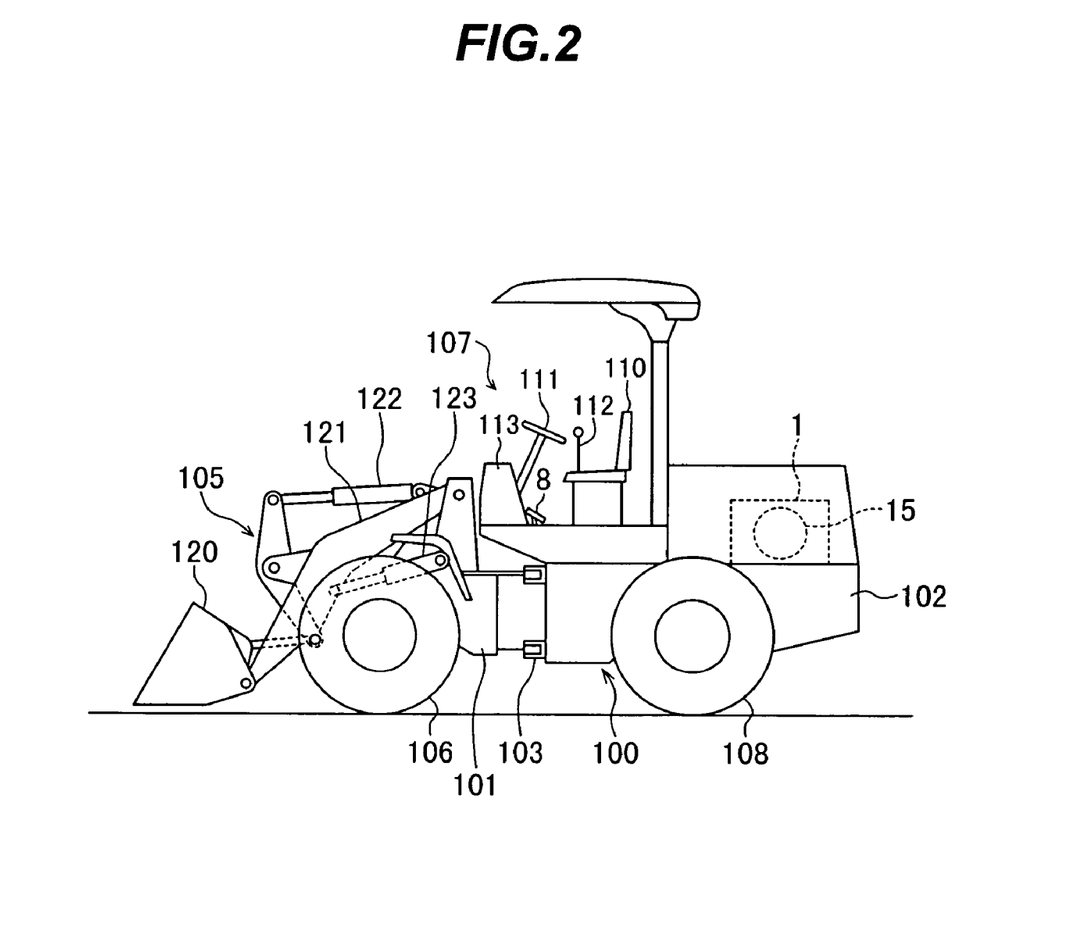
FIG. 2 shows an external appearance of a wheel loader as one example of the working vehicle to which the present invention is applied.

FIG. 2 shows an external appearance of a wheel loader as one example of the working vehicle to which the present invention is applied. In FIG. 2, numeral 100 denotes the wheel loader. The wheel loader 100 comprises a front body section 101 and a rear body section 102. The front body section 101 and the rear body section 102 are coupled to each other through a coupler 103 in an articulately flexible way. A front operating mechanism 105 and wheels (front wheels) 106 are mounted to the front body section 101, while a cab 107 and wheels (rear wheels) 108 are mounted to the rear body section 102. An operator's seat 110, a steering wheel 111, and a control lever 112 are provided in the cab 107. The front operating mechanism 105 is made up of a bucket 120 and a lift arm 121. The bucket 120 performs the tilting/dumping operation with contraction/extension of a bucket cylinder 122, and the lift arm 121 is operated upward and downward with extension/contraction of an arm cylinder 123. The actuator 17 shown in FIG. 1 is representative of the bucket cylinder 122 and the arm cylinder 123.

Further, the engine 1 and the hydraulic pump 15, shown in FIG. 1, are disposed in the rear body section 102 along with the control valve 16, the torque control regulator 21 and the torque control valve 22, and the rear wheels 108 are driven by the engine 1 through the transmission 5 and the axles 6. The travel pedal 8 is disposed on a floor of the cab 107, and the mode select switch 11 is disposed on A front cabinet 113 of the cab 107. The controller 10 is disposed in an appropriate position within the cab 107, e.g., a position below the operator's seat 110.

The actuator 17 shown in FIG. 1 is representative of the bucket cylinder 122 and the arm cylinder 123, and the front operating mechanism 105 can be operated by driving those cylinders.

Figure 3:
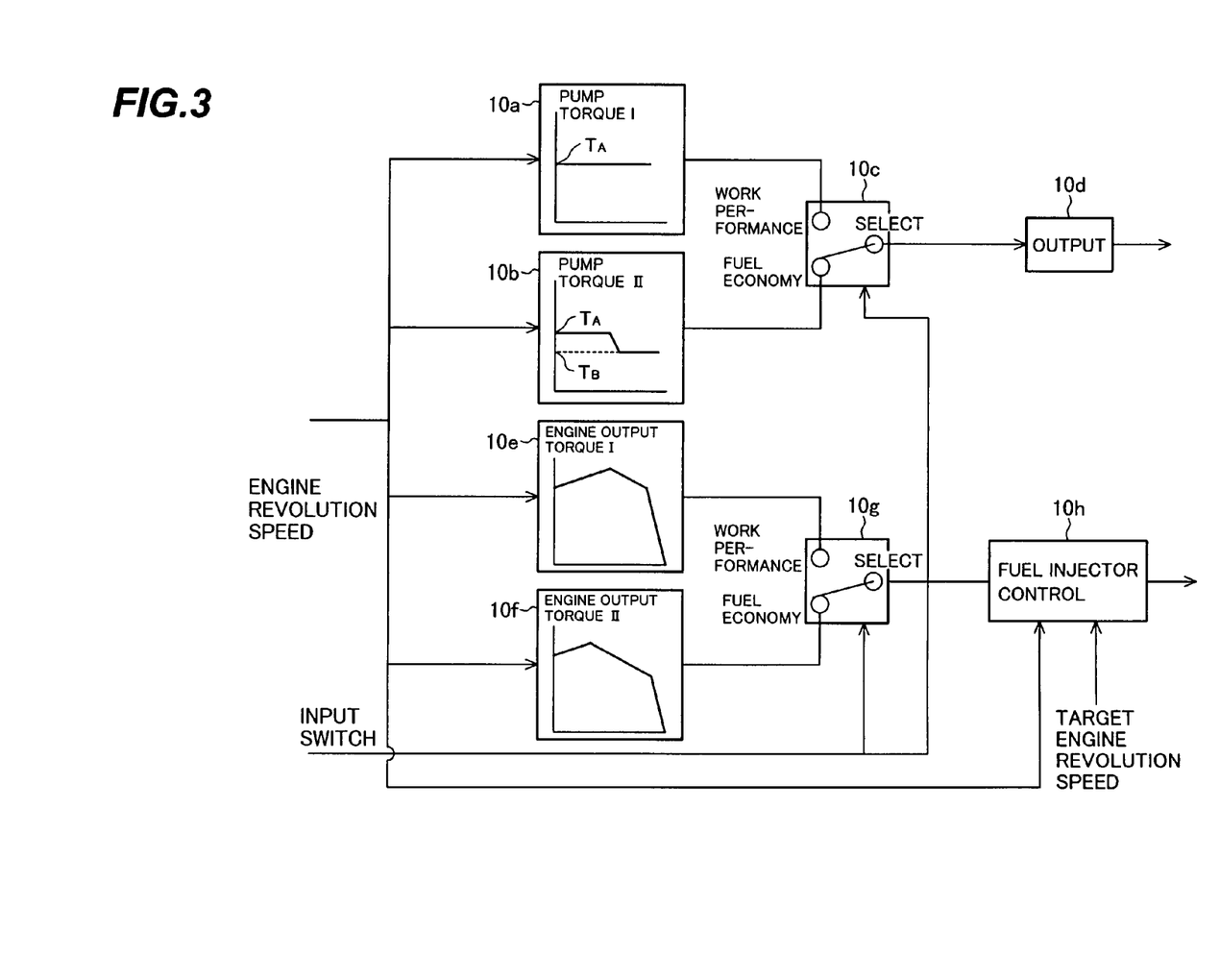
FIG. 3 is a functional block diagram showing details of control executed by a controller in engine control and pump control.

FIG. 3 is a functional block diagram showing details of processing executed by the controller 10 in engine control and pump control.

The controller 10 includes two tables 10a, 10b for deciding maximum absorption torques of the hydraulic pump 15 (i.e., maximum pump absorption torques) in accordance with the engine revolution speed, a selector 10c for switching over the maximum pump absorption torques decided based on those two tables 10a, 10b from one to the other depending on which one of the work performance mode and the fuel economy mode is selected, and an output unit 10d for outputting a command signal to the torque control solenoid valve 22 so that the maximum pump absorption torque selectively switched over by the selector 10c is obtained.

Further, the controller 10 includes two tables 10e, 10f for deciding output torques of the engine 1 (i.e., engine output torques) in accordance with the engine revolution speed, a selector 10g for switching over the engine output torques decided based on those two tables 10e, 10f from one to the other depending on which one of the work performance mode and the fuel economy mode is selected, and a fuel injector control unit 10h for computing a target fuel injection amount and outputting a control signal to the electronic fuel injector 2 so that the actual engine output torque will not exceed the engine output torque selectively switched over by the selector 10g.

Of the two tables 10a, 10b regarding the maximum pump absorption torque, the table 10a is used in the work performance mode and the table 10b is used in the fuel economy mode. The tables 10a, 10b set therein a pump absorption torque characteristic for the work performance mode and a pump absorption torque characteristic for the fuel economy mode, respectively. The pump absorption torque characteristic for the work performance mode is set such that the maximum pump absorption torque is constant regardless of the engine revolution speed and the constant maximum pump absorption torque has, for example, substantially the same magnitude TA as that of a conventional setting value of the torque control regulator. The pump absorption torque characteristic for the fuel economy mode is set such that the pump absorption torque has substantially the same magnitude TA as that of the maximum pump absorption torque for the work performance mode in a low revolution range and has a magnitude TB slightly smaller than the maximum pump absorption torque for the work performance mode in a high revolution range.

Figure 4:
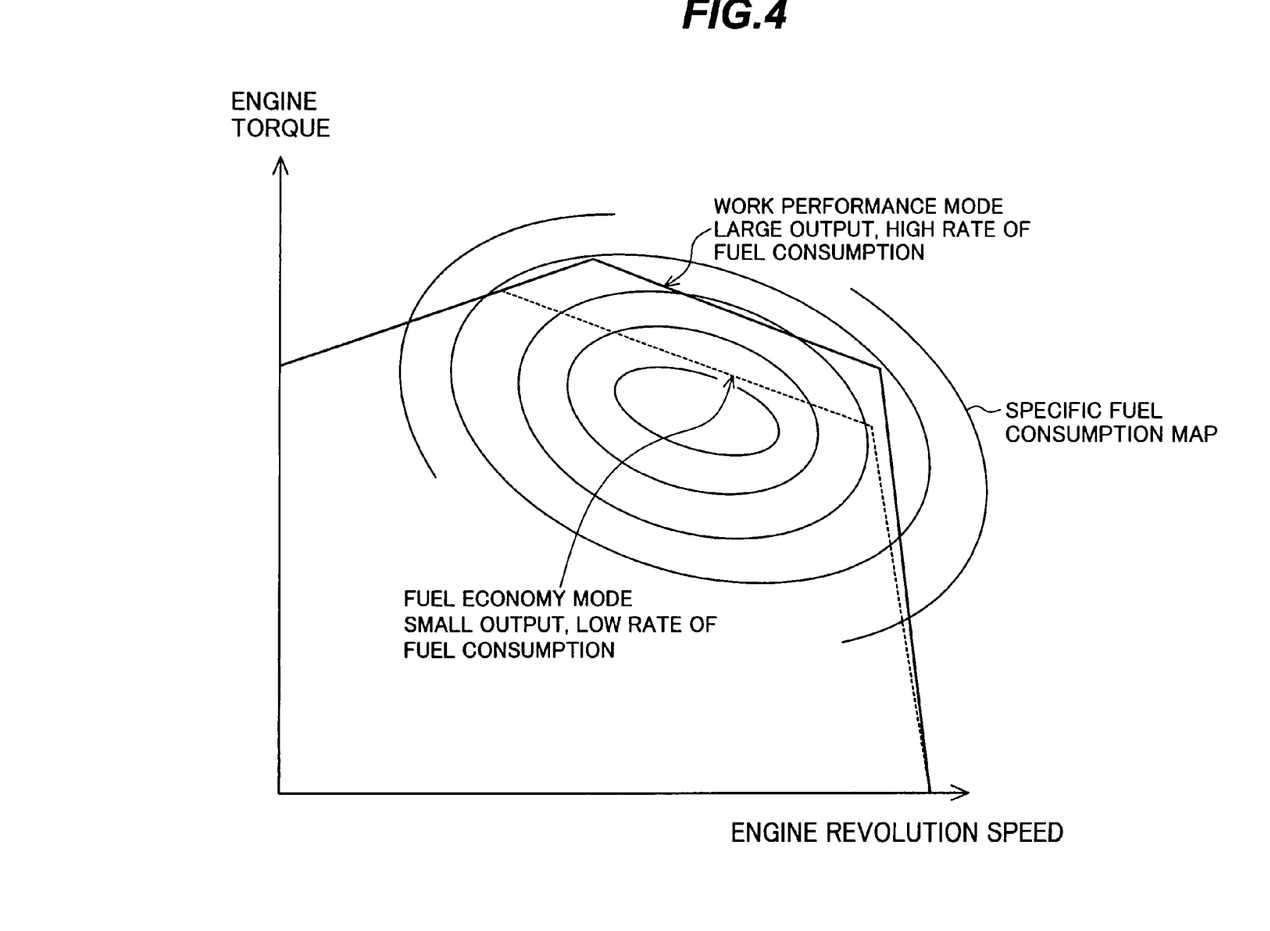
FIG. 4 is a graph comparatively showing an engine output characteristic for a work performance mode and an engine output characteristic for a fuel economy mode, those characteristics being set in a table.

Of the two tables 10e, 10f regarding the engine output torque, the table 10e is used in the work performance mode and the table 10f is used in the fuel economy mode. The tables 10e, 10f set therein an engine output characteristic for the work performance mode and an engine output characteristic for the fuel economy mode, respectively. FIG. 4 comparatively shows the engine output characteristic for the work performance mode and the engine output characteristic for the fuel economy mode which are set in the tables 10e, 10f, respectively. FIG. 4 also shows a specific fuel consumption map. The engine output characteristic for the work performance mode is set so as to provide a relatively large engine output torque in the high revolution range, and the engine output characteristic for the fuel economy mode is set so as to provide an engine output torque slightly smaller than that for the work performance mode in the high revolution range. An amount by which the engine output torque is reduced in the fuel economy mode corresponds to an amount by which the maximum pump absorption torque is reduced. In other words, the pump absorption torque characteristic for the fuel economy mode is set such that the maximum pump absorption torque is reduced in an amount corresponding to the amount by which the engine output torque is reduced in accordance with the engine output characteristic. Also, since the engine output torque according to the characteristic for the fuel economy mode in the high revolution range is smaller than that for the work performance mode, it is positioned on a line representing smaller fuel consumption than that in the work performance mode.

Each of the two tables 10a, 10b receives the revolution speed of the engine 1 detected by the revolution sensor 25 and decides the maximum pump absorption torque corresponding to the received engine revolution speed. The selector 10c receives a signal from the mode select switch 11, selects the maximum pump absorption torque decided based on the table 10a for the work performance mode when the signal received from the mode select switch indicates the work performance mode, and selects the maximum pump absorption torque decided based on the table 10b for the fuel economy mode when the signal received from the mode select switch 11 indicates the fuel economy mode. The maximum pump absorption torque selected by the selector 10c is sent to the output unit 10d, whereupon the output unit 10d converts the maximum pump absorption torque to a command signal for the torque control solenoid valve 22 and outputs the command signal.

Figure 5:
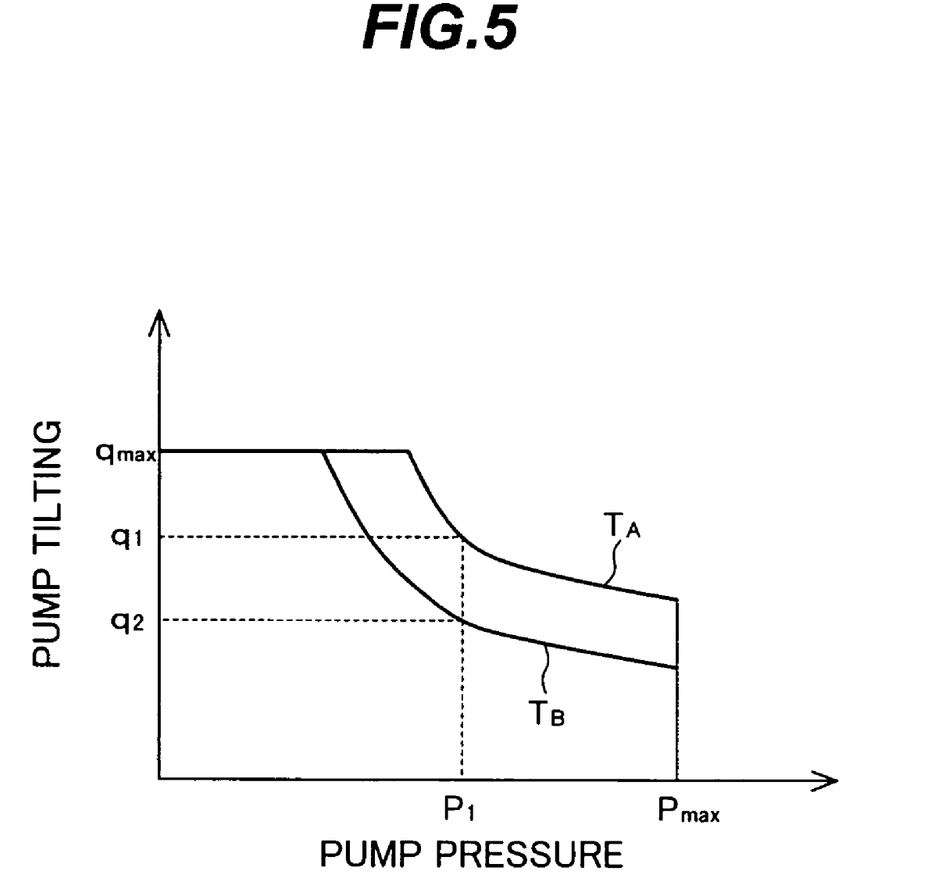
FIG. 5 is a graph showing the relationship between pump pressure and pump tilting when torque control is executed by a torque control regulator.

FIG. 5 shows the relationship between the delivery pressure of the hydraulic pump 15 (i.e., the pump pressure) and the tilting of the hydraulic pump 15 (i.e., the pump tilting) when the torque control regulator 21 is operated in accordance with the setting value that is variably controlled by the torque control regulator 22 as described above. When the table 10a for the work performance mode is selected, or when the table 10b for the fuel economy mode is selected and the engine 1 is in the low revolution range, the maximum pump absorption torque of the hydraulic pump 15 is given as TA. When the table 10b for the fuel economy mode is selected and the engine 1 is in the high revolution range, the maximum pump absorption torque of the hydraulic pump 15 is given as TB. When the pump delivery pressure rises, the torque control regulator 21 reduces the pump tilting along the characteristic line of the maximum pump absorption torque in a responsive manner to control the tilting (displacement) of the hydraulic pump 15 so that the absorption torque of the hydraulic pump 15 will not exceed the setting value (maximum pump absorption torque) TA or TB. Also, even at the same pump pressure P1, when the maximum pump absorption torque decreases from TA to TB, the pump tilting is reduced from q1 to q2 and the pump delivery rate is also reduced correspondingly.

Each of the other two tables 10e, 10f receives the revolution speed of the engine 1 detected by the revolution sensor 25 and decides the engine output torque corresponding to the received engine revolution speed. The selector 10g receives a signal from the mode select switch 11, selects the engine output torque decided based on the table 10e for the work performance mode when the signal received from the mode select switch indicates the work performance mode, and selects the engine output torque decided based on the table 10f for the fuel economy mode when the signal received from the mode select switch 11 indicates the fuel economy mode. The engine output torque selected by the selector 10g is sent to the fuel injector control unit 10h, which computes the target fuel injection amount and outputs a control signal to the electronic fuel injector 2 so that the actual engine output torque will not exceed the selected engine output torque.

Figure 6:
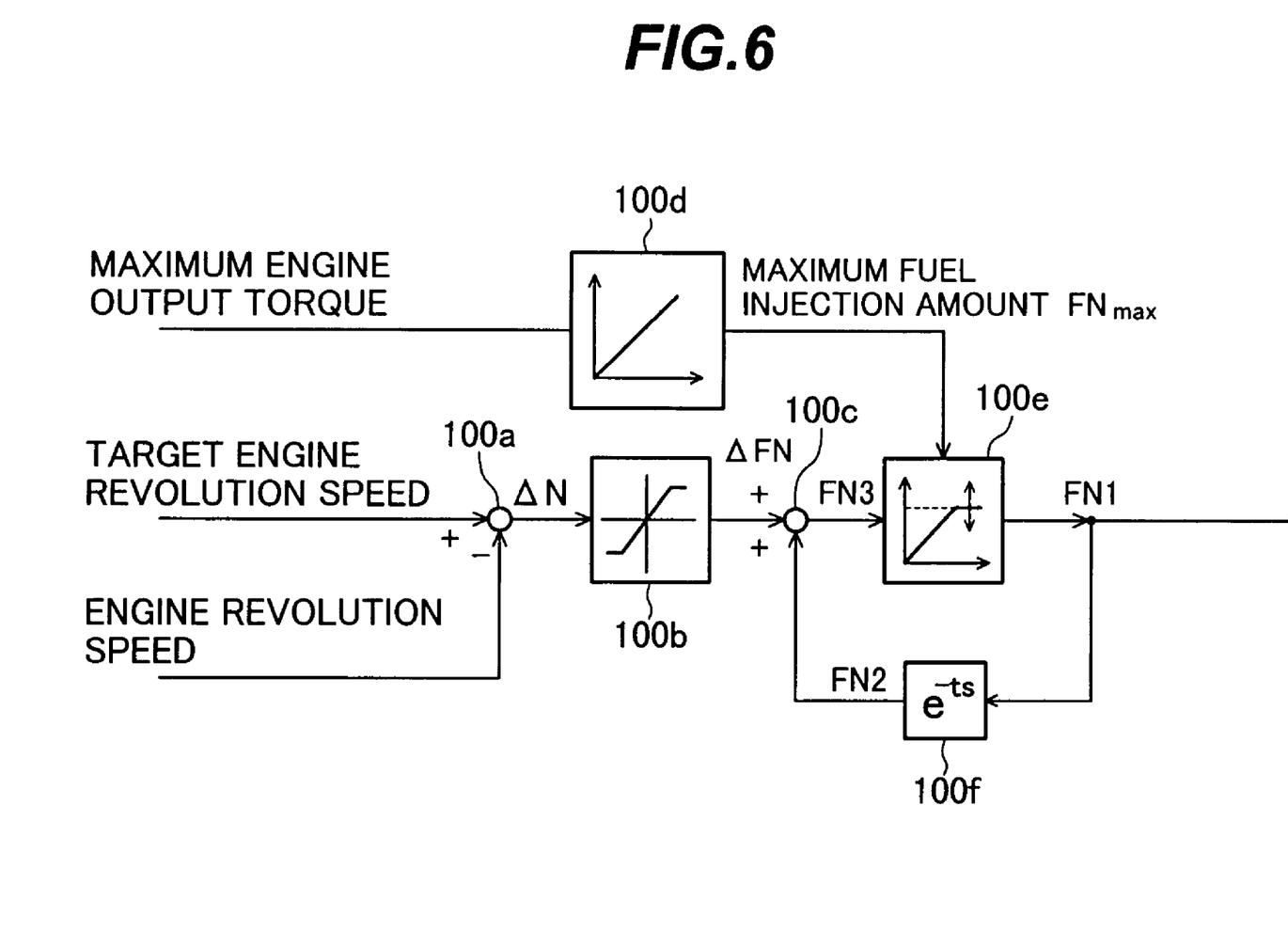
FIG. 6 is a functional block diagram showing details of processing executed in a fuel injector control unit.

FIG. 6 is a functional block diagram showing details of processing executed in the fuel injector control unit 10h.

The fuel injector control unit 10h has various control functions executed in a revolution speed deviation computing unit 100a, a fuel injection amount converting unit 100b, an integral addition unit 100c, a maximum fuel injection amount computing unit 100d, a limit computing unit 100e, and a primary delay element 100f.

The revolution speed deviation computing unit 100a compares the target engine revolution speed instructed from the travel pedal 8 with the actual engine revolution speed detected by the revolution sensor 25, to thereby compute a revolution speed deviation ΔN. The fuel injection amount converting unit 100b multiplies the revolution speed deviation ΔN by a gain KF and then executes upper and lower limit processing to compute an increment ΔFN of the target fuel injection amount. The integral addition unit 100c adds the increment ΔFN to a preceding value FN2 of a target fuel injection amount FN1 from the primary delay element 100f, thereby computing a new target fuel injection amount FN3.

On the other hand, the engine output torque selected by the selector 10g is sent to the maximum fuel injection amount computing unit 100d, whereupon the maximum fuel injection amount computing unit 100d converts the engine output torque to a fuel injection amount and sends the fuel injection amount, as a maximum fuel injection amount FNmax, to the limit computing unit 100e. Herein, the engine output torque and the fuel injection amount are substantially in proportional relation, and the maximum fuel injection amount computing unit 100d executes the above conversion based on that relation.

Figure 7:
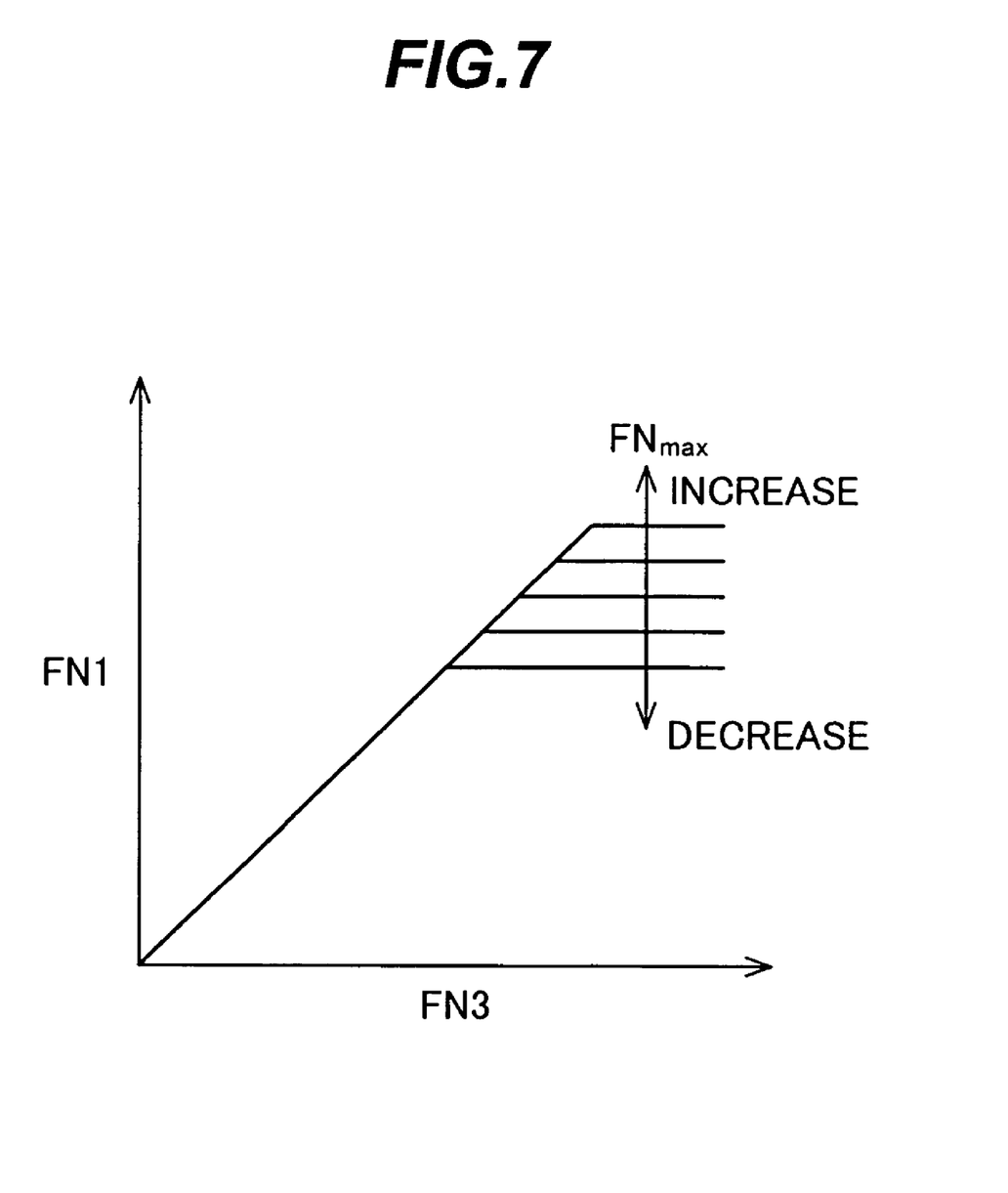
FIG. 7 is a graph showing how a limit value of an upper limiter is increased and decreased by a limit computing unit with an increase and decrease of a maximum fuel injection amount.

The limit computing unit 100e multiplies the target fuel injection amount FN3 by an upper limiter to compute the target fuel injection amount FN1. A limit value of the upper limiter is variable and set such that, as shown in FIG. 7, the limit value of the upper limiter is increased and decreased as the maximum fuel injection amount FNmax increases and decreases.

The target fuel injection amount FN1 obtained by the limit computing unit 100e is converted to a control current, and the control current is outputted to the electronic fuel injector 2 for control of the fuel injection amount. Thus, the fuel injection amount is controlled such that the target fuel injection amount FN1 is increased when the actual engine revolution speed is smaller than the target revolution speed (i.e., when the revolution speed deviation ΔN is positive), and the target fuel injection amount FN1 is decreased when the actual engine revolution speed is larger than the target revolution speed (i.e., when the revolution speed deviation ΔN is negative). As a result, the revolution speed deviation ΔN becomes 0 and the actual engine revolution speed is matched with the target revolution speed. Also, the fuel injection amount is controlled such that the output torque of the engine 1 will not exceed the engine output torque which has been decided based on the table 10e or 10f and selected by the selector 10g.

In the construction described above, the torque control regulator 21 constitutes first pump torque control means for controlling the absorption torque of the hydraulic pump 15 not to exceed the maximum absorption torque. The tables 10a, 10b, the selector 10c and the output unit 10d of the controller 10, and the torque control solenoid valve 22 constitute second pump torque control means for selecting one of at least two preset pump absorption torque characteristics in response to an instruction from the mode select switch 11 and controlling the maximum absorption torque of the hydraulic pump 15 in accordance with the selected pump absorption torque characteristic. The tables 10e, 10f, the selector 10g, and the fuel injector control unit 10h constitute engine torque control means for selecting one of at least two engine output torque characteristics in response to the instruction from the mode select switch 11 and controlling the electronic fuel injector 2 in accordance with the selected engine output torque characteristic, thereby controlling the output torque of the engine 1.

Figure 8:
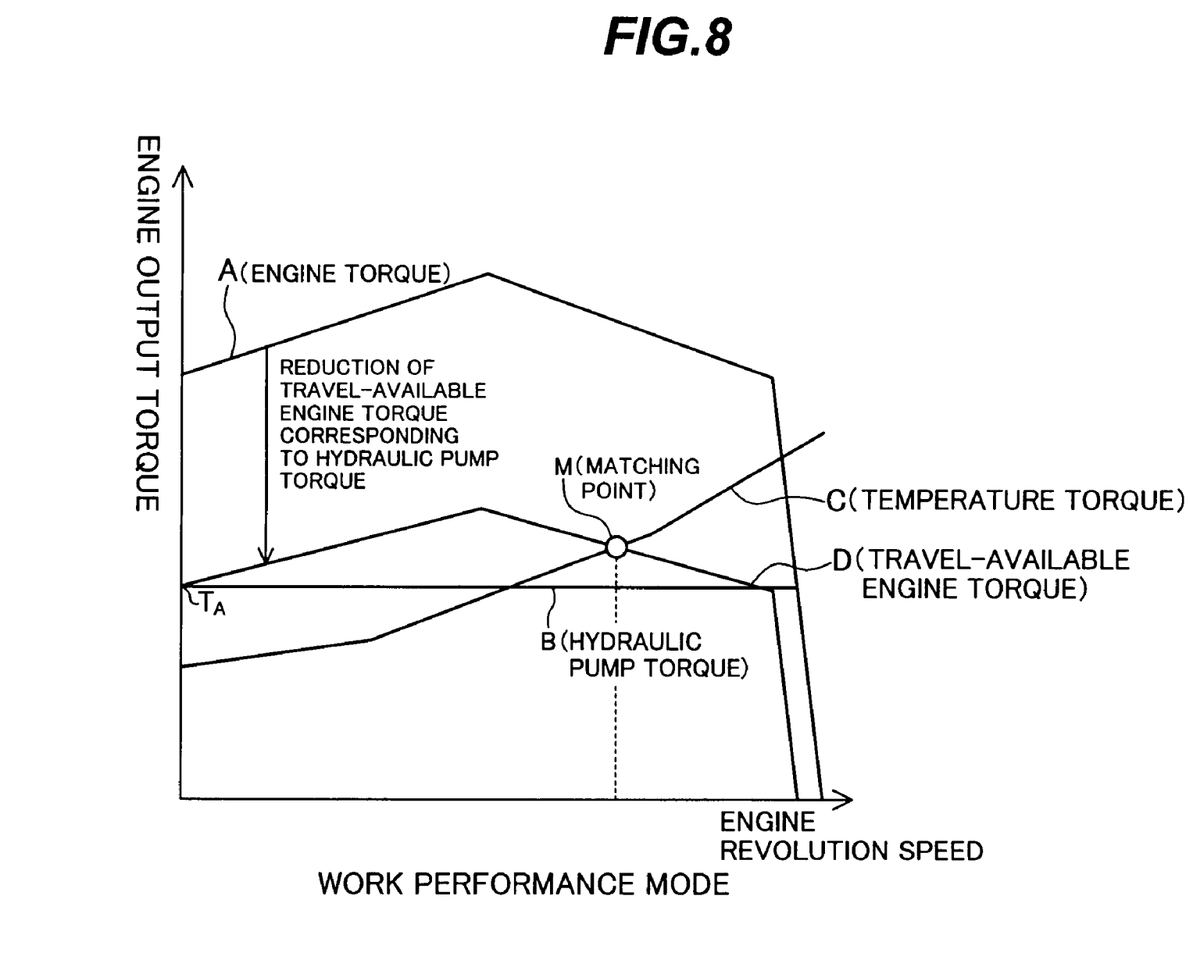
FIG. 8 is a graph showing the relationships among engine output torque, maximum pump absorption torque, and transmission torque when the work performance mode is selected.
Figure 9:
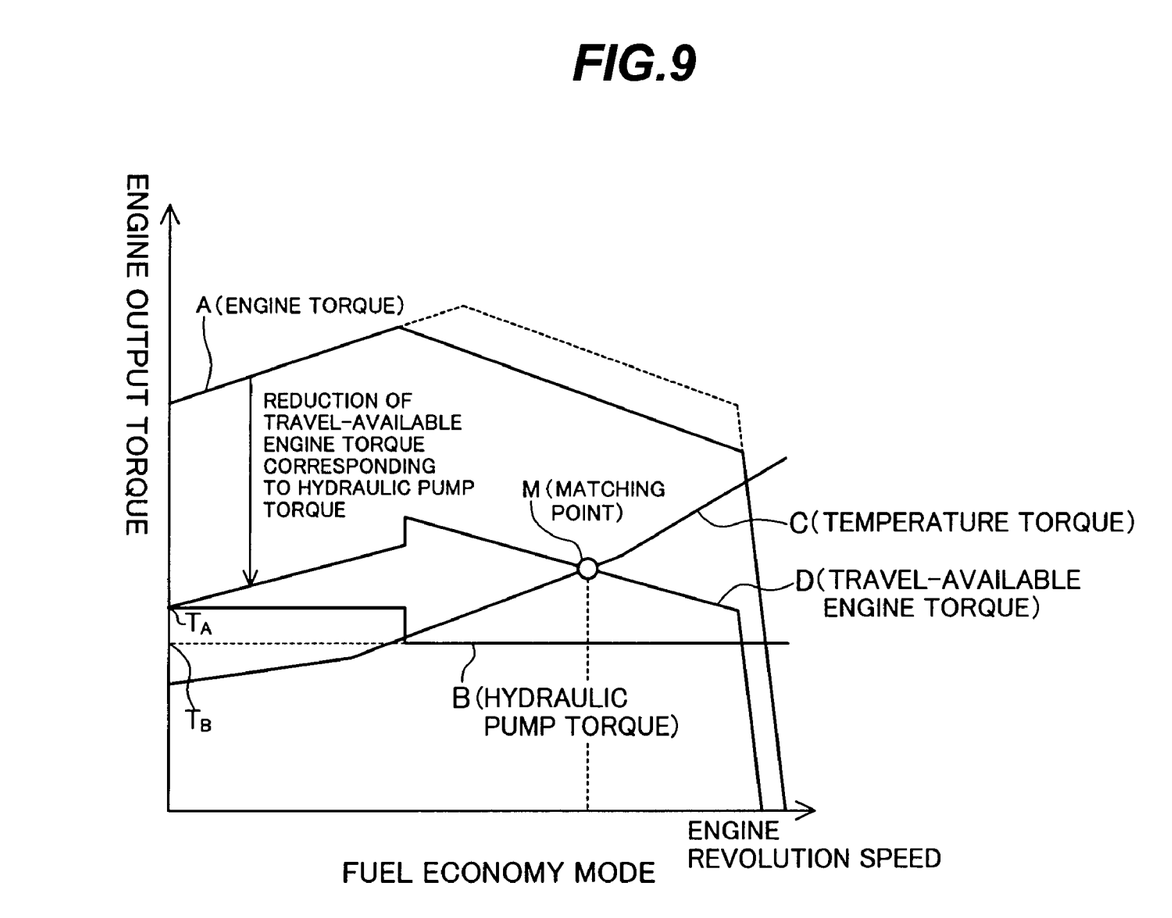
FIG. 9 is a graph showing the relationships among engine output torque, maximum pump absorption torque, and transmission torque when the fuel economy mode is selected.

FIG. 8 shows the relationships among the output torque of the engine 1 (i.e., the engine output torque), the maximum absorption torque of the hydraulic pump 15 (i.e., the maximum pump absorption torque), and the transmission torque when the work performance mode is selected. FIG. 9 shows the relationships among the engine output torque, the maximum pump absorption torque, and the transmission torque when the fuel economy mode is selected. In the drawings, A represents the engine output torque and B represents the maximum pump absorption torque. These torques correspond respectively to the engine output torque characteristics set in the tables 10e, 10f and the pump absorption torque characteristics set in the tables 10a, 10b. Further, C represents the transmission torque. The term "transmission torque" means an input torque of the transmission 5 when the transmission 5 is driven by the engine 1. The transmission torque is increased as the engine revolution speed rises. Also, assuming the definition of a transmission speed ratio=output revolution speed of the transmission 5/input revolution speed of the transmission 5 (=engine revolution speed), the transmission torque is increased as the speed ratio reduces. The transmission torque shown in each of FIGS. 8 and 9 represents one at a certain transmission speed ratio.

In FIGS. 8 and 9, a torque D available by the transmission 5 (i.e., a travel-available engine output torque D) is smaller than the engine output torque by an amount corresponding to the maximum pump absorption torque. An intersect M between a characteristic of the travel-available engine output torque D and a characteristic of the transmission torque C represents a matching point, and the engine revolution speed at the matching point M corresponds to the certain transmission speed ratio.

When the work performance mode is selected, the torque decided in accordance with the engine output torque characteristic set in the table 10e, shown in FIG. 3, is selected as the engine output torque, and the torque decided in accordance with the pump absorption torque characteristic set in the table 10a, shown in FIG. 3, is selected as the maximum pump absorption torque. Then, the difference between those selected torques is provided as the travel-available engine output torque. In this case, the magnitude of the torque decided in accordance with the pump absorption torque characteristic set in the table 10a is substantially the same as that conventionally set. Therefore, the delivery rate of the hydraulic pump 15 is relatively large and sufficient work performance can be ensured. Further, since the engine output torque characteristic set in the table 10e provides a relatively large torque in the high revolution range, the characteristic of the travel-available engine output torque D also provides a relatively large torque in the high revolution range, and hence a sufficient travel force can be obtained at the matching point M.

When the fuel economy mode is selected, the torque decided in accordance with the engine output torque characteristic set in the table 10f, shown in FIG. 3, is selected as the engine output torque, and the torque decided in accordance with the pump absorption torque characteristic set in the table 10b, shown in FIG. 3, is selected as the maximum pump absorption torque. Then, the difference between those selected torques is provided as the travel-available engine output torque. In this case, the engine output torque characteristic set in the table 10f provides the torque having a magnitude slightly smaller than that in the work performance mode in the high revolution range. Correspondingly, the pump absorption torque characteristic set in the table 10b also provides the torque having a magnitude slightly smaller than that in the work performance mode in the high revolution range. Therefore, the delivery rate of the hydraulic pump 15 is slightly reduced and so is the work performance. However, since the magnitude of the travel-available engine torque in the high revolution range is substantially the same as that when the work performance mode is selected, the travel force is held substantially the same as that when the work performance mode is selected, whereby a sufficient travel force can be obtained.

Further, the engine output torque is slightly reduced in the high revolution range. As shown in FIG. 4, therefore, the engine 1 can be operated in an area of the specific fuel consumption map where a smaller fuel consumption rate is obtained, and fuel economy can be improved.

According to this embodiment, as described above, when the work performance mode is selected by the mode select switch 11, the torque decided in accordance with the engine output torque characteristic set in the table 10e and adapted for higher work performance is selected, and therefore the work performance can be increased. When the fuel economy mode is selected, the torque decided in accordance with the engine output torque characteristic set in the table 10f and adapted for fuel economy is selected, and therefore the fuel economy effect can be obtained. Also, when the fuel economy mode is selected, the torque decided in accordance with the pump absorption torque characteristic set in the table 10b and having a relatively small torque in the high revolution range is selected, and therefore the torque decided in accordance with the engine torque characteristic for traveling in the high revolution range is not reduced. As a result, a large travel force can be maintained and good workability can be held.

A second embodiment of the present invention will be described below with reference to FIGS. 10 and 11. In these drawings, identical components to those shown in FIGS. 3 and 6 are denoted by the same symbols.

Figure 10:
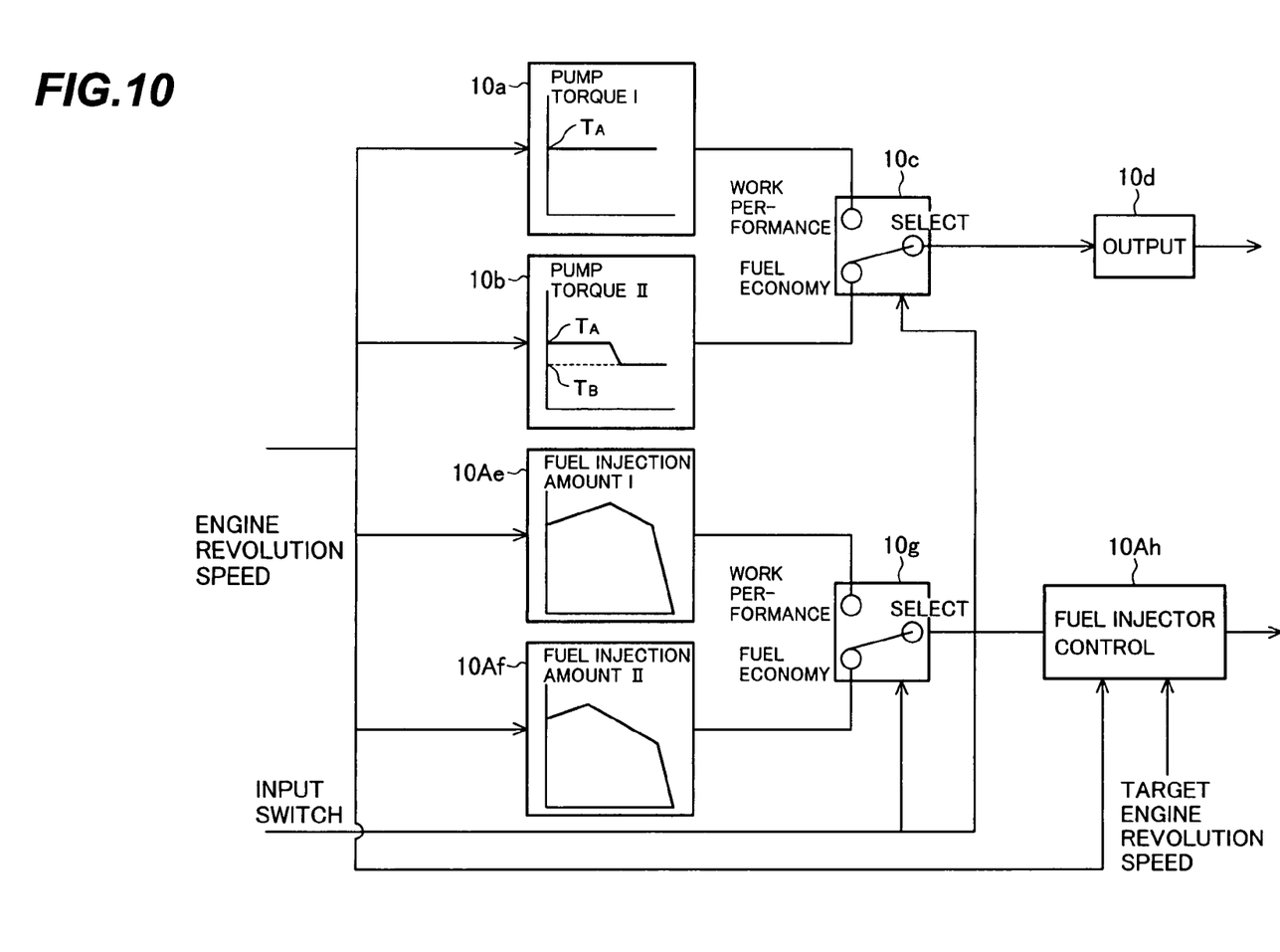
FIG. 10 is a functional block diagram showing details of control executed by a controller in engine control and pump control according to a second embodiment of the present invention.
Figure 11:
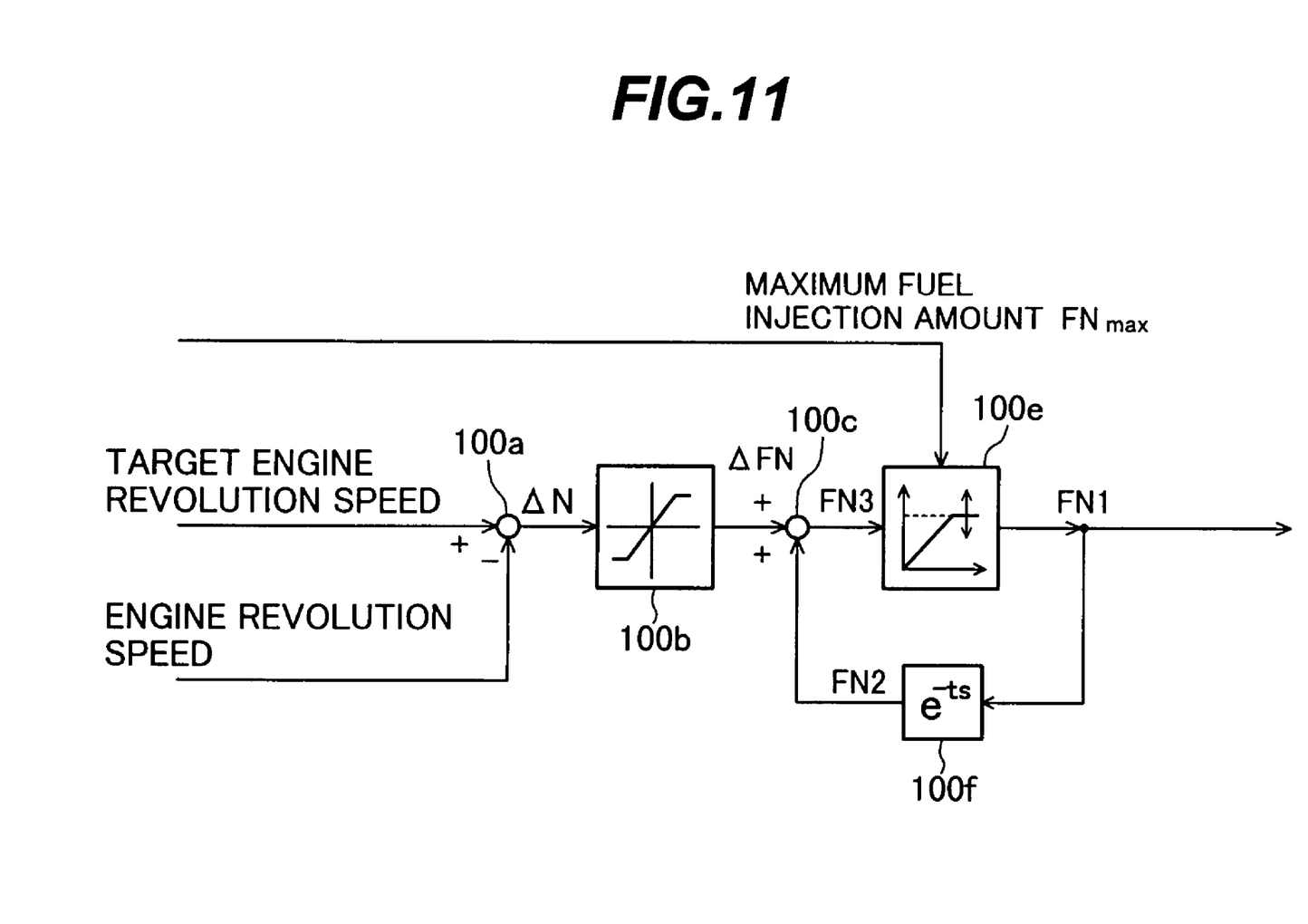
FIG. 11 is a functional block diagram showing details of processing executed in a fuel injector control unit.

FIG. 10 is a functional block diagram showing details of processing executed by a controller in engine control and pump control according to this embodiment. FIG. 10 corresponds to FIG. 3 regarding the first embodiment. Also, FIG. 11 is a functional block diagram showing details of processing executed in a fuel injector control unit. FIG. 11 corresponds to FIG. 6 regarding the first embodiment.

In this second embodiment, two tables 10Ae, 10Af for the engine control, shown in FIG. 10, set therein characteristics of the fuel injection amounts instead of the engine output torques, and directly decide the fuel injection amounts in accordance with the engine revolution speed. In this case, the term "fuel injection amount" means the fuel injection amount per engine revolution, and the characteristics of the fuel injection amounts are decided in accordance with the engine output torque characteristics set in the tables 10e, 10f in the first embodiment. Stated another way, the tables 10Ae, 10Af set therein the fuel injection amount characteristic for the work performance mode and the fuel injection amount characteristic for the fuel economy mode, respectively, and those characteristics are ones capable of realizing the engine output torque characteristic for the work performance mode and the engine output torque characteristic for the fuel economy mode which are set in the tables 10e, 10f, respectively.

As a result, in a fuel injector control unit 10Ah, the maximum fuel injection amount computing unit 100d is no longer required, and the fuel injection amount selected by the selector 10g is directly inputted as the maximum fuel injection amount FNmax to the limit computing unit 100e.

In the construction described above, the tables 10a, 10b, the selector 10c and the output unit 10d of the controller 10, and the torque control solenoid valve 22 (see FIG. 1) constitute second pump torque control means for selecting one of at least two preset pump absorption torque characteristics in response to an instruction from the mode select switch 11 and controlling the maximum absorption torque of the hydraulic pump 15 in accordance with the selected pump absorption torque characteristic. The tables 10Ae, 10Af, the selector 10g, and the fuel injector control unit 10Ah constitute engine torque control means for selecting one of at least two preset engine output torque characteristics in response to the instruction from the mode select switch 11 and controlling the electronic fuel injector 2 in accordance with the selected engine output torque characteristic, thereby controlling the output torque of the engine 1.

This embodiment thus constructed can also provide similar advantages to those obtained with the first embodiment.

In addition, according to this embodiment, since the fuel injection amount per engine revolution is directly determined corresponding to the engine revolution speed, more accurate torque control can be performed at each engine revolution speed.

The invention claimed is:

1. A control system for a working vehicle comprising an engine, a travel pedal for instructing a target revolution speed of said engine, a fuel injector for controlling a fuel injection amount depending on the target revolution speed of the engine thereby to control an output torque and revolution speed of said engine, a transmission for traveling including a torque converter which is driven by said engine, a variable displacement hydraulic pump driven by said engine, and a hydraulic actuator driven by a hydraulic fluid delivered from said hydraulic pump, and first pump torque control means for controlling an absorption torque of said hydraulic pump not to exceed a maximum absorption torque, wherein said control system comprises:

switching-over means;

engine torque control means for selecting one of at least two preset engine output characteristics with respect to an engine revolution speed in response to an instruction from said switching-over means, determining a maximum fuel injection amount corresponding to the engine revolution speed at the current time in accordance with the selected engine output characteristic, and controlling said fuel injector such that the fuel injection amount controlled depending on the target revolution speed of the engine does not exceed said maximum fuel injection amount, thereby controlling the output torque of said engine; and second pump torque control means for selecting one of at least two preset pump absorption torque characteristics with respect to an engine revolution speed in response to the instruction from said switching-over means and determining a maximum absorption torque corresponding to the engine revolution speed at the current time in accordance with the selected pump absorption torque characteristic, thereby controlling the maximum absorption torque of said hydraulic pump; and said switching-over means is a switch for instructing one of a work performance mode and a fuel economy mode;

said engine torque control means selects the output torque characteristic providing, in the fuel economy mode, a slightly smaller engine output torque in a relatively high range of the engine revolution speed than that in the work performance mode; and said second pump torque control means selects the pump absorption torque characteristic providing, in the fuel economy mode, a slightly smaller maximum pump absorption torque in the relatively high range of the engine revolution speed than that in the work performance mode corresponding to a reduction of the engine output torque made by said engine torque control means.

2. The control system for the working vehicle according to claim 1, wherein said engine torque control means sets, as the engine output characteristic, an engine output torque characteristic with respect to the engine revolution speed and determines an engine output torque corresponding to the engine revolution speed at the current time in accordance with the selected engine output torque characteristic, and then converts the determined engine output torque into said maximum fuel injection amount.

3. The control system for the working vehicle according to claim 1, wherein said engine torque control means sets, as the engine output characteristic, a fuel injection amount characteristic with respect to the engine revolution speed and determines a fuel injection amount corresponding to the engine revolution speed at the current time, and then uses the determined fuel injection amount as said maximum fuel injection amount.

* * * * *